(12) United States Patent
Ng et al.

(10) Patent No.: US 10,264,247 B2
(45) Date of Patent: Apr. 16, 2019

(54) MULTI-VIEW DISPLAYS

(71) Applicant: Misapplied Sciences, Inc., Redmond, WA (US)

(72) Inventors: Albert Han Ng, Redmond, WA (US); Paul Henry Dietz, Redmond, WA (US); David Steven Thompson, Redmond, WA (US)

(73) Assignee: Misapplied Sciences, Inc., Redmond, WA (US)

( * ) Notice: Subject to any disclaimer, the term of this patent is extended or adjusted under 35 U.S.C. 154(b) by 0 days.

(21) Appl. No.: 15/015,099

(22) Filed: Feb. 3, 2016

(65) Prior Publication Data

US 2016/0227201 A1    Aug. 4, 2016

Related U.S. Application Data

(63) Continuation-in-part of application No. 15/002,014, filed on Jan. 20, 2016.
(Continued)

(51) Int. Cl.
*H04N 13/351* (2018.01)
*G02B 27/28* (2006.01)
(Continued)

(52) U.S. Cl.
CPC ............. *H04N 13/351* (2018.05); *G02B 3/08* (2013.01); *G02B 27/286* (2013.01); *G02F 1/29* (2013.01);
(Continued)

(58) Field of Classification Search
CPC ................................................ H04N 13/0447
See application file for complete search history.

(56) References Cited

U.S. PATENT DOCUMENTS

| 5,855,425 A | 1/1999 | Hamagishi | |
| 6,339,421 B1 * | 1/2002 | Puckeridge | A61M 16/0051 345/170 |

(Continued)

FOREIGN PATENT DOCUMENTS

| EP | 2685735 A1 | 1/2014 |
| WO | 0224470 A | 3/2002 |
| WO | 2013183108 A1 | 12/2013 |

OTHER PUBLICATIONS

"Non-Final Office Action", U.S. Appl. No. 15/002,158, dated Mar. 3, 2017, pp. 19.
(Continued)

*Primary Examiner* — Robin J Mishler
(74) *Attorney, Agent, or Firm* — Kaplan Breyer Schwarz, LLP

(57) ABSTRACT

A multi-view display is a display capable of simultaneously showing different images to viewers that see the display from different locations. Viewers do not see the images intended for other viewers at other locations. A multi-view display in accordance with some embodiments of the present invention comprises a light source with a light-emitting aperture that emits light whose direction of propagation can be controlled by a controller. An aperture filter mounted on the aperture forms one or more visible images. Different viewers see different visible images based on characteristics of the light such as color and/or polarization. In some embodiments, the aperture filter can be an active filter, such as an LCD filter, that displays different images synchronized with the direction of propagation of the light.

14 Claims, 15 Drawing Sheets

Numerical Multi-View Display Realized with an Active Aperture Filter

Related U.S. Application Data

(60) Provisional application No. 62/111,566, filed on Feb. 3, 2015.

(51) Int. Cl.
| | | |
|---|---|---|
| *G02B 3/08* | (2006.01) | |
| *G02F 1/29* | (2006.01) | |
| *H04N 13/327* | (2018.01) | |
| *H04N 13/307* | (2018.01) | |
| *H04N 13/30* | (2018.01) | |

(52) U.S. Cl.
CPC ......... *H04N 13/307* (2018.05); *H04N 13/327* (2018.05); *H04N 2013/40* (2018.05)

(56) References Cited

U.S. PATENT DOCUMENTS

| | | | |
|---|---|---|---|
| 6,377,295 | B1 | 4/2002 | Woodgate et al. |
| 7,001,023 | B2 | 2/2006 | Lee et al. |
| 7,602,395 | B1 | 10/2009 | Diard |
| 7,990,498 | B2 | 8/2011 | Hong |
| 8,461,995 | B1 | 6/2013 | Thornton |
| 9,080,279 | B2 | 7/2015 | Jun et al. |
| 9,715,827 | B2 | 7/2017 | Ng et al. |
| 9,743,500 | B2 | 8/2017 | Dietz et al. |
| 9,792,712 | B2 | 10/2017 | Ng et al. |
| 2003/0115096 | A1 | 6/2003 | Reynolds et al. |
| 2003/0156260 | A1 | 8/2003 | Putilin et al. |
| 2005/0195330 | A1 | 9/2005 | Zacks et al. |
| 2007/0040892 | A1 | 2/2007 | Aoki et al. |
| 2009/0273486 | A1 | 11/2009 | Sitbon |
| 2010/0085517 | A1 | 4/2010 | Hong |
| 2010/0207961 | A1 | 8/2010 | Zomet |
| 2010/0214537 | A1 | 8/2010 | Thomas |
| 2011/0159929 | A1* | 6/2011 | Karaoguz .......... H04N 21/4312 455/566 |
| 2011/0216171 | A1 | 9/2011 | Barre et al. |
| 2011/0242298 | A1 | 10/2011 | Bathiche et al. |
| 2011/0304613 | A1 | 12/2011 | Thoresson |
| 2012/0026157 | A1* | 2/2012 | Unkel .................... G09G 3/003 345/419 |
| 2012/0062565 | A1 | 3/2012 | Fuchs et al. |
| 2012/0105445 | A1 | 5/2012 | Sakai et al. |
| 2012/0140048 | A1 | 6/2012 | Levine |
| 2012/0218253 | A1 | 8/2012 | Clavin |
| 2013/0093752 | A1 | 4/2013 | Yuan |
| 2013/0114019 | A1 | 5/2013 | Ijzerman et al. |
| 2013/0169765 | A1 | 7/2013 | Park et al. |
| 2013/0321599 | A1 | 12/2013 | Harrold et al. |
| 2014/0015829 | A1 | 1/2014 | Park et al. |
| 2014/0035877 | A1 | 2/2014 | Cai et al. |
| 2014/0111101 | A1 | 4/2014 | McRae |
| 2015/0020135 | A1 | 1/2015 | Frusina et al. |
| 2015/0042771 | A1 | 2/2015 | Jensen et al. |
| 2015/0049176 | A1 | 2/2015 | Hinnen et al. |
| 2015/0062314 | A1* | 3/2015 | Itoh .................... G06F 3/012 348/55 |
| 2015/0085091 | A1* | 3/2015 | Varekamp .......... G02B 27/2214 348/59 |
| 2015/0092026 | A1 | 4/2015 | Baik et al. |
| 2015/0154394 | A1 | 6/2015 | Kapinos et al. |
| 2015/0198940 | A1 | 7/2015 | Hwang et al. |
| 2015/0279321 | A1 | 10/2015 | Falconer et al. |
| 2015/0334807 | A1 | 11/2015 | Gordin et al. |
| 2015/0365422 | A1 | 12/2015 | Peterson et al. |
| 2016/0012726 | A1 | 1/2016 | Wang |
| 2016/0210100 | A1 | 7/2016 | Ng et al. |
| 2016/0212417 | A1 | 7/2016 | Ng et al. |
| 2016/0224122 | A1 | 8/2016 | Dietz et al. |
| 2016/0227201 | A1 | 8/2016 | Ng et al. |
| 2016/0261837 | A1 | 9/2016 | Thompson et al. |
| 2016/0261856 | A1 | 9/2016 | Ng et al. |
| 2016/0293003 | A1 | 10/2016 | Ng et al. |
| 2016/0341375 | A1 | 11/2016 | Baker |
| 2016/0341377 | A1 | 11/2016 | Eddins |
| 2016/0366749 | A1 | 12/2016 | Dietz et al. |
| 2016/0371866 | A1 | 12/2016 | Ng et al. |
| 2017/0205889 | A1 | 7/2017 | Ng et al. |

OTHER PUBLICATIONS

Authorized Officer: Jacinta Molloy, "International Search Report and Written Opinion" dated Sep. 29, 2016 issued in PCT Application No. PCT/US2016/037185.
"Office Action" dated Oct. 6, 2016 issued in U.S. Appl. No. 15/060,527.
Officer: Patricia Stein, "International Search Report and Written Opinion", dated Jun. 3, 2016, issued in related PCT Application: PCT/US2016/04122.
"Non-Final Office Action" dated Jan. 31, 2017, Issued in U.S. Appl. No. 15/180,341.
Authorized Officer: Mehrdad Dastouri, "International Preliminary Report on Patentability" dated Feb. 3 2017 issued in PCT International Application PCT/US16/14122, 21 pp.
"Non-Final Office Action", dated Mar. 22, 2017, Issued in related U.S. Appl. No. 15/002,164, 28 pp.
Officer: Jeffrey Harold, "International Preliminary Report on Patentability", Completed Mar. 20, 2017, Issued in International Patent Application PCT/US2016/020784, 6 pp.
"Notice of Allowance and Fees Due", U.S. Appl. No. 15/180,341, dated Jul. 11, 2017, 7 pp.
Officer: Patricia Stein, "International Search Report and Written Opinion", dated May 12, 2016, issued in related PCT Application: PCT/US2016/020784.
"Non-Final Office Action", U.S. Appl. No. 15/060,527, dated May 19, 2017, 13 pp.
"Non-Final Office Action", Related U.S. Appl. No. 15/184,874, dated May 22, 2017, 19 pp.
"Non-Final Office Action", Related U.S. Appl. No. 15/015,099, dated May 4, 2017, 9 pp.
"Non-Final Office Action", dated Mar. 24, 2017, Issued in related U.S. Appl. No. 15/002,175, 26 pp.
"Non-Final Office Action", dated Jan. 26, 2017, issued in U.S. Appl. No. 15/088,912.
"Notice of Allowance", Issued in U.S. Appl. No. 15/184,874, dated Sep. 8, 2017, 14 pp.
"Final Office Action", U.S. Appl. No. 15/002,164, dated Oct. 5, 2017, 27 pp.
"Final Office Action", U.S. Appl. No. 15/002,175, dated Nov. 2, 2017, 21 pp.
"Non-Final Office Action", U.S. Appl. No. 15/002,014, dated Oct. 27, 2017, 11 pp.
"Non Final Office Action" dated Apr. 4, 2018 in U.S. Appl. No. 15/002,158, pp. 23.
"Non-Final Office Action" dated Feb. 8, 2018 in U.S. Appl. No. 15/060,527.
"Non-Final Office Action" in U.S. Appl. No. 15/062,103 dated Feb. 14, 2018.
Office Action for European Application No. 16707570.4, dated Sep. 13, 2018, 6 pages.
Non-Final Office Action for U.S. Appl. No. 15/062,103 dated Oct. 11, 2018, 9 pages.
Final Office Action for U.S. Appl. No. 15/060,527 dated Oct. 5, 2018, 14 pages.
Final Office Action for U.S. Appl. No. 15/002,158 dated Oct. 5, 2018, 22 pages.

* cited by examiner

Lenticular Picture 100

Image Interleaving 200

Alignment of Interleaved Print and Lens Array

Dual-View Lenticular Poster 400

Stereoscopic Lenticular Picture 500
(from above)

Lens Array of Spherical Lenses 600

Principle of Image Projection 700

"Programmable Visibility" Traffic Signal 900

Traffic Signal 800 for Vehicular Traffic

Possible Internal Structure of "Programmable Visibility" Traffic Signal –
Light Source Implemented with Focal-Plane "Optical Limiter"

Alternative Internal Structure of "Programmable Visibility" Traffic Signal –
Light Source Implemented with Focal-Plane LED Array "Programmable Visibility" Traffic Signal
with Focal-Plane LED Array and Aperture Filter Dual-Polarized Aperture Filter 1300

Three-Color Color-Selective Aperture Filter 1400

Four-Color Color-Selective Aperture Filter 1500

Two-Color Color-Selective and Dual Polarized Aperture Filter 1600

Three-Color Color-Selective Aperture Filter Realized with Colored Sheets

Color Interleaving Pattern

Cut-Out Pattern for Blue

Cut-Out Pattern for Green

Cut-Out Pattern for Red

Aperture Image for Blue

Cut-Out for Blue Image

Aperture Image for Green

Cut-Out for Green Image

Aperture Image for Red

Cut-Out for Red Image cut-out for green image from FIG. 21b areas to cut out of blue sheet cut-out for red image from FIG. 21a Alphanumeric Sixteen-Segment Display Numerical Seven-Segment Display Numerical Multi-View Display Realized with an Active Aperture Filter Multi-View Display for Displaying Only One Segment

Improved Multi-View Display for Displaying Only One Segment

MULTI-VIEW DISPLAYS

CROSS REFERENCE TO RELATED APPLICATIONS

The underlying concepts, but not necessarily the language, of the following cases are incorporated by reference:
(1) U.S. provisional application No. 62/111,566; and
(2) U.S. nonprovisional application Ser. No. 15/002,014.
If there are any contradictions or inconsistencies in language between this application and one or more of the cases that have been incorporated by reference that might affect the interpretation of the claims in this case, the claims in this case should be interpreted to be consistent with the language in this case.

This case claims benefit of the following provisional application:
(1) U.S. provisional application No. 62/111,566;

This case is a Continuation-in-Part and claims priority of co-pending U.S. Ser. No. 15/002,014 titled "Method for Calibrating a Multi-View Display" and filed on 20 Jan., 2016.

FIELD OF THE INVENTION

The present invention relates to electronic displays, and, more particularly, to electronic displays intended for simultaneously displaying multiple distinct images.

BACKGROUND

Ever since antiquity, people have created pictures. In ancient times, pictures were exclusively static pictures generated, for example, by painting, or drawing on a surface. In modern times, photography has provided the ability of creating pictures through technological tools, and cinematography has provided the ability to create moving pictures, first in black and white and, later, in color. More recently, electronic displays, such as computer monitors, TV sets, and projectors, have become the most common devices for displaying moving pictures.

With very few exceptions, electronic displays generate pictures that are perceived the same regardless of the position of the viewer. Indeed, a lot of engineering effort has been devoted to achieving displays with a wide viewing angle and with minimal degradation of the picture even for viewers looking at the display from directions that are very different from optimal. There are, however, situations where it is desirable to have a display that shows different pictures when viewed from different angles. Such displays are known as multi-view displays. For still pictures, techniques have been available for a long time to achieve such a result, albeit with limited picture quality and with other important limitations.

FIG. 1 depicts a so-called lenticular picture 100 in the prior art. A lenticular picture provides multi-view functionality for still images. It is realized as a picture that a viewer 130 can hold in his/her hand. The lenticular picture comprises a grooved sheet of plastic with a paper backing. The front of the sheet of plastic is shaped such that the grooves form an array 110 of cylindrical lenses, as shown in detailed view 115 in the figure. The paper backing is a print of two or more interleaved images; the print is shown in FIG. 1 as interleaved print 120.

In FIG. 1, the grooves constituting the cylindrical lenses of array 110 are arranged horizontally. As a consequence, the viewer 130 of the lenticular picture can rotate the picture about a horizontal axis 140 in order to see different images. As the lenticular picture is rotated in the direction, for example, of rotation 150, different images become sequentially visible on the viewable surface of the lenticular picture, with each sequential image occupying the entire viewable surface, when visible. While one sequential image is visible, the other sequential images are not visible.

FIG. 2 Illustrates the process of creating interleaved print 120. In this example, the objective is that the final lenticular picture will show two distinct sequential images, one with a large letter "A", and the other with a large letter "B".

Each one of the two images is processed by slicing it into a large number of horizontal stripes, and then every other stripe is removed. In FIG. 2, the result of this process for the letter "A" is shown as first image 210-1. The familiar outline of the letter "A" is clearly identifiable even though a large number of white stripes obliterate part of it. The result of the same process for the letter "B" is shown as second image 210-2. Again, the outline of the letter "B" is clearly identifiable.

There is an important difference between the two processed images: in the case of the letter "B", the stripes that were removed were not the same stripes that were removed when processing the letter "A"; rather, they were the alternate stripes. As a consequence, the two images can be combined with the stripes of one image fitting (interleaving) between the stripes of the other image. The result is shown in FIG. 2 as interleaved image 220, which can be printed on paper to create interleaved print 120 for the lenticular picture.

FIG. 3 Illustrates how a lenticular picture functions. It is based on a phenomenon that can be explained via geometrical optics: at any viewing angle, the cylindrical lenses show only a set of narrow horizontal stripes from the underlying printed image. FIG. 3 shows viewer 130 and a magnified depiction of lenticular picture 100 seen in cross section; the lenticular picture is angled such that the viewer sees visible image 310, which is the letter "B". The height of the lenticular picture spans an angle of view 320 from the point of view of the viewer.

The cross-section depiction shows details of what happens with three of the cylindrical lenses, identified by their respective axes of symmetry 330-1, 330-2, and 330-3. For the middle cylindrical lens 330-2, the line of sight from the viewer's eyes to the lenticular picture is approximately at right angle to the plane of the lenticular picture; for the other two cylindrical lenses, the line of sight is at a different angle. The figure shows the light rays that reach the viewer's eyes from different points on the interleaved print. In particular, when the viewer looks up toward cylindrical lens 330-1, the viewer sees the bundle of light rays 340-1 that originates from point 350-1 on the interleaved print; the position of the point 350-1 on the interleaved image of the letter "B" is shown in the inset 360-1. When the viewer looks straight ahead toward cylindrical lens 330-2, the viewer sees the bundle of light rays 340-2 that originates from point 350-2 on the interleaved print; the position of the point 350-2 on the interleaved image of the letter "B" is shown in the inset 360-2. When the viewer looks down toward cylindrical lens 330-3, the viewer sees the bundle of light rays 340-3 that originates from point 350-3 on the interleaved print; the position of the point 350-3 on the interleaved image of the letter "B" is shown in the inset 360-3.

The set of stripes that is visible from the interleaved print through the cylindrical lenses depends on the viewing angle, and it changes when the viewing angle changes. By rotating the lenticular picture about horizontal axis 140, viewer 130 can cause the lenticular picture to show different sets of stripes from the underlying interleaved print. When the set of stripes being shown falls on top of stripes from the letter "A", the viewer will see a letter "A"; and when the viewing angle is changed such that the set of stripes being shown falls on top of stripes form the letter "B", the viewer will see a letter "B". In both cases, the other letter is not visible at all because no other stripes are made visible by the cylindrical lenses.

The interleaving process illustrated in FIGS. 2 and 3 can be implemented for more than two images. For example, a lenticular picture can show three distinct images, each at a different viewing angle. To realize such a lenticular picture, each of the three images is sliced into equal-size stripes, but only every third stripe is retained. The three sets of retained stripes are then combined into a single interleaved print.

For a lenticular picture to operate as planned, the alignment and scaling of the print relative to the lens array must be precise. Of course, the cylindrical lenses must be carefully aligned with the stripes, or else different images might become visible simultaneously in different parts of the picture. Additionally, the spacing of the stripes, relative to the spacing of the cylindrical lenses, must be calculated and implemented with precision. FIG. 3 shows that the viewing angle from the viewer's eyes to the surface of the picture is different in different parts of the picture, and the exact extent of difference depends on the distance between the viewer and the picture. Accordingly, the spacing of the stripes needs to be slightly different from the spacing of the cylindrical lenses, and it depends on the desired viewing distance.

For these reasons, it is difficult to create lenticular pictures with more than a few different images, and it is difficult to achieve image quality comparable to that of conventional pictures. As a result, lenticular pictures have not progressed much beyond novelty items and specialized applications. The problem of achieving the necessary precision alignment remains an important obstacle to wider use of lenticular pictures and other types of multi-view displays.

FIG. 4 depicts a prior-art application for a dual-view lenticular picture. A poster 400 for public viewing is realized as a lenticular picture with horizontal cylindrical lenses. The poster is shown in a public area where both adults and children might be present. The purpose of the poster is to show a message intended for adults that might be unsuitable for young children. Because young children are generally shorter than adults, the angle from which they view the poster is different from the angle of view of an adult. This is illustrated in FIG. 4, where child 410 can be observed to have a different view of the poster, compared to adult 420.

The lenticular picture of poster 400 can be adjusted to show one image to individuals taller than a certain height, who can be presumed to be adults, while children, who are shorter, see a different image. For the poster to work correctly and achieve the desired objective, it is necessary to know a number of parameters with good accuracy prior to manufacturing the poster. The needed parameters include, among others, the viewer-height threshold at which the changeover from one image to the other is to occur, the distance between the viewers and the poster, and the height above ground where the poster is going to be installed. Such parameters and others need to be known with a good level of precision, and the installation locale must be such that these parameters do not vary significantly from viewer to viewer. These are significant constraints, and they illustrate the reason why multi-view pictures of this type are not more common.

FIG. 5 depicts another prior-art application of multi-view lenticular pictures. The figure illustrates the principle of operation of a stereoscopic lenticular picture. Seen from above, on the left in the figure, a viewer's head 510 is looking at stereoscopic lenticular picture 500. The viewer's left eye 520 and right eye 530 are depicted in the figure. The viewer's left eye sees the picture from an angle that is slightly different from the angle of view of the right eye.

Unlike the lenticular pictures in the previous figures, the cylindrical lenses in lenticular picture 500 are aligned vertically instead of horizontally and, of course, the multiple images on the interleaved print are interleaved with vertical stripes instead of horizontal stripes. As a consequence, different images become sequentially visible when the viewer moves horizontally relative to the picture.

The left eye and the right eye of the viewer see the lenticular picture 500 from different positions that are shifted horizontally, relative to one another; and the parameters of the lenticular picture can be selected such that the two eyes see different images. The desired stereoscopic effect is achieved when the two different images are the images that the left and right eyes would see when looking at the original subject of the picture.

FIG. 6 shows a lens array in the prior art wherein the individual lenses are spherical lenses instead of cylindrical lenses.

FIG. 7 illustrates the principle of operation of a typical image projector. The illustration applies to old-fashioned movie projectors and slide projectors that project images from film, and it also applies to modern electronic projectors. In all such cases, the image to be projected onto a screen originates as a bright image that emits light, shown in the figure as bright image 710. In the case where film is used for the image, the light comes from a bright light bulb behind the film, and the film acts as a filter that selectively allows the passage of light of different colors and intensities in different portions of the image. A similar technique is used in some modern projectors wherein the filter might be a liquid-Crystal Display (LCD) module or some other type of electronic light filter, instead of film. Alternatively, the bright image might be generated by an array of bright sources such as, for example, light-emitting diodes (LED), or by digital micromirror devices that reflect light from a separate source.

The term "pixel" is widely used in conjunction with images and image processing. It is a contraction of "picture element" and it refers to the smallest image-forming unit of a display. In particular, an image such as bright image 710 is generally composed of a large number of pixels, wherein each pixel emits light in a wide range of directions. Each pixel emits light of a particular color and intensity, such that the collection of all the pixels forms a pattern that is perceived as an image by the human eye.

In a projector, as depicted in FIG. 7, some of the light emitted by each pixel is collected by a lens 720. In the figure, two pixels are highlighted explicitly as pixel 730-1 and 730-2. The figure shows, for example, the light 740-1 emitted by pixel 730-1 and collected by the lens 720. The lens is adjusted such that the light collected from the pixel is focused into a light beam 750-1 focused on a projection screen some distance away (the screen is not shown explicitly in the figure). When the light beam 750-1 reaches the screen, it produces a bright spot on the screen. The color and brightness of the spot are the same as the color and brightness of pixel 730-1 in the bright image 710. The light 740-2 from pixel 730-2 is also processed by the lens 720 in similar fashion, such that it also produces a bright spot on the screen whose color and brightness are the same as the color and brightness of pixel 730-2. All the pixels of the bright image 710 produce bright spots on the screen in similar fashion. The collection of all the bright spots on the screen forms the projected image.

Pixel-based displays are advantageous because of their flexibility at being able to display any image, but there are many display applications where the images to be displayed are chosen from a very small set of even just only a couple or a small number of possible images. In such applications, the cost and complexity of a full pixel-based display is often not justifiable. In such applications, it is advantageous to have a lower-cost display that achieves good image quality by taking advantage of the limited number of images to be displayed. This is true for conventional displays and also for multi-view displays.

SUMMARY

A multi-view display is able to show different images to different viewers. Based on the position of the viewer relative to the multi-view display, each viewer sees a different image while looking at the display surface of the multi-view display and does not see the images seen by other viewers. This is in contrast to conventional displays which show the same image to all viewers regardless of where the viewers are positioned relative to the display.

In a typical conventional (non multi-view) electronic display, a visible image is formed as a collection of pixels. Each pixel emits light in response to electrical excitation. The brightness of a pixel depends on the extent of excitation. Each pixel emits light in all directions, such that all viewers perceive pixels the same way, regardless of viewer position.

There are conventional displays, on the other hand, where images are formed by means other than pixels. Neon signs, for example, can create complex images with glass tubes that glow in bright colors. Such alternative methods of image creation are often found in situations where only a still image is needed, or where a limited choice of a small number of possible images is acceptable. Flashing neon signs that alternate between a few possible images are, again, a good example.

Traffic and directional signals for automobiles, trains, pedestrians, etc. are another example of displays that do not require the full flexibility of image creation via pixels. With traffic lights for vehicles, the most common image to be displayed is a bright disc in one of three colors. Arrows are also common, with or without colors. Few other images are ever needed.

In situations where only a limited number of simple images, such as discs and arrows, needs to be displayed, pixel-based displays are not commonly used. In some cases, it is advantageous to generate the individual images with separate display units that are juxtaposed; other times it is desirable to have a single unit that can display a few different images. The familiar traffic lights for automobiles are in the first category. In the second category, some old-fashioned railroad signals used to have a single light source whose color was changed by placing different color filters in front of it; they are now no longer in use.

The benefits of multi-view capability can be advantageous in many situations where such non-pixel-based light sources are currently used. For example, and without limitation, in a crowded railroad yard, it might be advantageous to have a single traffic signal that serves multiple tracks. With multi-view capability, such a signal might show different images to different tracks, as needed for controlling traffic. Also, for example, and without limitation, in a theme park where many people need directions, but different people have different destinations, it might be useful to have an information sign that can display different directional arrows for different viewers of the sign. Embodiments of the present invention can be used to realize such multi-view signals and displays in a variety of designs and with several advantages, compared to conventional non-multi-view displays or compared to pixel-based multi-view displays.

The foregoing brief summary summarizes some features of some embodiments of the present invention. It is to be understood that many variations of the invention are possible, and that the scope of the present invention is defined by the claims accompanying this disclosure in conjunction with the full text of this specification and the accompanying drawings.

DETAILED DESCRIPTION

Figure 8:
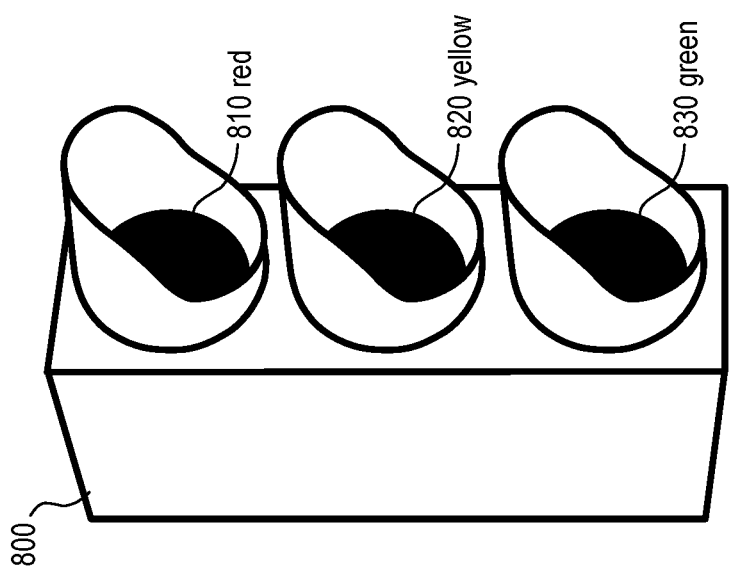
FIG. 8 depicts a conventional traffic signal for vehicular traffic in the prior art.

FIG. 8 depicts a conventional traffic signal 800 for vehicular traffic in the prior art. It is a familiar object for most people in the modern world. It can display three possible images: a bright red disc 810 at the top, a bright yellow disc 820 in the middle, and a bright green disc 830 at the bottom. Each of the three discs can be independently bright or dark. All viewers of the traffic signal, regardless of position, see the three discs the same way: bright or dark, depending on whether or not a light source behind the disc is on or off.

Figure 9:
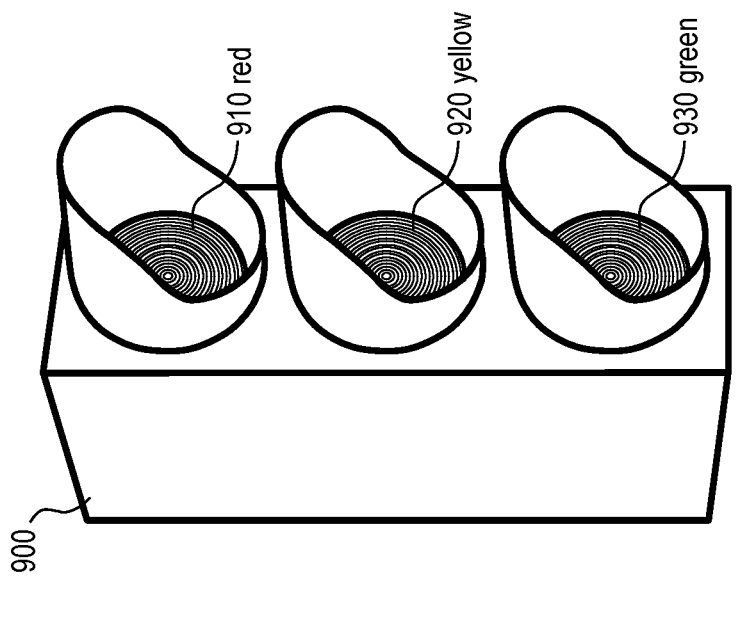
FIG. 9 depicts a so-called "programmable visibility" traffic signal for vehicular traffic in the prior art.

FIG. 9 depicts a so-called "programmable visibility" traffic signal 900 for vehicular traffic in the prior art. Its physical appearance is similar to traffic signal 800, and it also can display three possible images: a bright red disc 910 at the top, a bright yellow disc 920 in the middle, and a bright green disc 930 at the bottom. However, the light sources for the three images are designed such that not all viewers see the three discs the same way. Such a traffic signal might be used, for example, where two traffic lanes are very near one another, and vehicles in the two lanes must be controlled independently.

The light sources for the three discs 910, 920, and 930 in programmable-visibility traffic signal 900 are designed such that some viewers in certain positions might see a disc as dark, while other viewers in other positions see the same disc as bright. With proper adjustment, positioning and aiming of the traffic signal, it is then possible to individually control a particular traffic lane without the risk that drivers in adjacent lanes might see the bright discs and perform maneuvers that they are not supposed to perform.

In FIG. 9, the visible discs are depicted as comprising several concentric circles. This depiction is based on a common implementation of programmable-visibility traffic signals wherein the visible discs are realized with so-called Fresnel lenses. The depiction reproduces the familiar appearance of Fresnel lenses.

Figure 10:
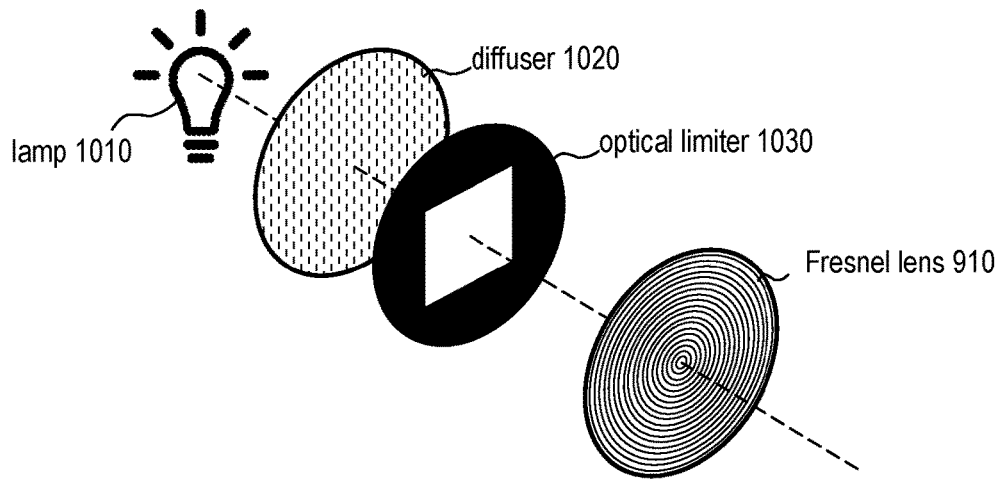
FIG. 10 depicts a possible internal structure for one of the three light sources of the programmable-visibility traffic signal of FIG. 9.

FIG. 10 depicts a possible internal structure for one of the three light sources of the programmable-visibility traffic signal 900. The Fresnel lens, which is the outwardly visible element of the light source, is depicted at right as Fresnel lens 910. Behind the Fresnel lens, light is emitted by lamp 1010. The light goes through the diffuser 1020, whose role is to ensure uniform illumination behind so-called "optical limiter" 1030. The optical limiter is positioned in the focal plane of the Fresnel lens.

The Fresnel lens is a convergent lens; i.e., it is a lens that creates an image at infinity of whatever is present in its focal plane. In this case, the distance from the traffic signal to the road is large enough to be equivalent to infinity and, therefore, an image of the optical limiter is formed on the road.

The optical limiter is simply a mask that blocks some of the light from the diffuser in accordance with the shape of the optical limiter. In the depiction of FIG. 10, the optical limiter is a dark disc with a square opening in the middle. The opening allows the passage of light diffused by the diffuser. Accordingly, the image created by the optical limiter is a bright square on a dark background, and it is the image that is formed on the road in front of the traffic signal.

Vehicles that happen to be in parts of the road where the bright square is imaged will see a bright illuminated disc when looking at the Fresnel lens. Vehicles that happen to be in parts of the road where the dark background is imaged will see a dark disc when looking at the Fresnel lens. The bright disk will be uniformly illuminated over the entire area of the Fresnel lens, as long as the diffuser and the Fresnel lens itself are appropriately designed. It is well known in the art how to achieve such appropriate designs; however, a perfectly uniform illumination might be difficult to achieve and might not be necessary in practice. In most applications, there are typically standards that define acceptable levels of accuracy. For traffic signals there are extensive standards that define what should be considered adequate illumination of the disks. Hereinafter, uses of the word "uniform" should be understood to mean that the relevant standards are met.

The shape of optical limiter 1030 can be customized, as needed, such that the image formed on the road spans only the area where vehicles are supposed to see the bright disc.

Figure 11:
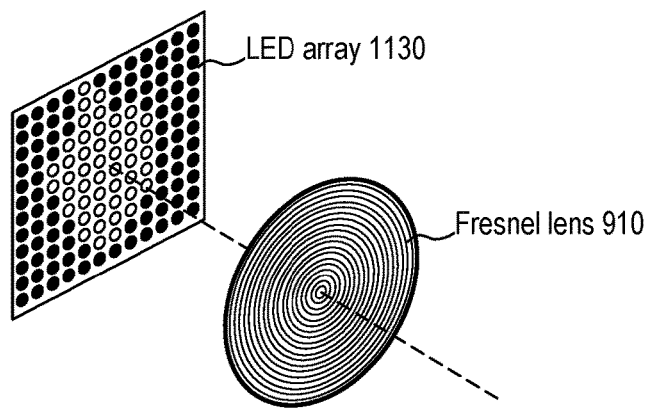
FIG. 11 depicts a possible alternative internal structure for the light source of FIG. 10.

FIG. 11 depicts a possible alternative internal structure for the light source of FIG. 10. In this alternative structure, instead of the optical limiter, the bright image in the focal plane of the Fresnel lens is generated by an array of light-emitting diodes (LED) depicted as LED array 1130. An image can be created on the LED array by selectively turning some LEDs on and other LEDs off. In the depiction of FIG. 11, LEDs that are on are depicted as white circles, and LEDs that are off are depicted as dark circles. The use of the LED array in the focal plane makes it easier to define the image to be formed on the road, compared to using the optical limiter. With the optical limiter, any modification to the image requires replacing the optical limiter with a different optical limiter that has the desired shape. In contrast, the LED array can be simply programmed to have a different pattern of LEDs on or off.

Regardless of the shape of the image present in the focal plane of the Fresnel lens, the disc of the lens itself always appears either uniformly illuminated or uniformly dark, depending on where the viewer is positioned on the road. No other shapes or images are visible on the disc, expect for possible artifacts or imperfections due to non-ideal behavior of devices and components. On the other hand, the color of the bright disc, when visible, can be controlled by controlling the color of the light source. For example, in FIG. 10, the color is determined by the color of the lamp and by the color of the diffuser. It is possible to add a color filter to the design, or to use a colored lamp or a colored diffuser to give a desired color to the light. The bright disc will then emit light of that color.

In FIG. 11, the use of LEDs makes it easy to generate colored light because LEDs are readily available in many colors. The LED array can comprise LEDs of different colors for the purpose of generating colored images in the focal plane. Viewers will see the bright disc as being uniformly illuminated with the color of the focal-plane LED that is turned on in the focal-plane position that corresponds to their location on the road.

Hereinafter, the disc-shaped surface of the Fresnel lens, which becomes uniformly illuminated when the appropriate LED is turned on, will be referred to as the "aperture" of the light source. In general, the aperture can be of a shape other than a disc, and it can be realized with devices other than a Fresnel lens. Those skilled in the art will know how to make and use light sources that provide a functionality similar to the light source of FIG. 11 for use in embodiments of the present invention. Such light sources are characterized by an aperture that can be made to appear uniformly illuminated for some viewers in some positions, but not for other viewers in other positions, meaning that the light emitted by the aperture has a direction of propagation that can be controlled.

The light source of FIG. 11 can generate light of a particular color or combination of colors by employing LEDs that emit light of that color or combination of colors. The aperture of the light source is the visible surface of the Fresnel lens, and this particular type of light source can generate light that is emitted by the aperture in one or more directions of propagation that are controllable by turning on or off LEDs that correspond to different directions of propagation.

The size of the LED array determines the range of directions of propagation in which the light source can generate light. Each direction of propagation is associated with a region of space that receives the generated light. In the example of the traffic signal of FIG. 9, each direction of propagation is associated with a portion of the road where viewers might or might not be required to see the signaling. The traffic signal can then only turn on LEDs for those portions of the road where the signaling is supposed to be visible. It is important that the traffic signal be properly oriented, and that the LED array be of sufficient size, to ensure that an LED is available for all portions of the road where viewers are supposed to see the signaling.

The range of positions from which viewers can see the light generated by the light source is referred to as the viewing space. Because the LED array 1130 is two-dimensional, the direction of propagation of the light generated by the light source can be controlled in two angular dimensions. By successively turning LEDs on or off that lie on a vertical column in LED array 1130, the elevation angle of the direction of propagation is changed. By successively turning LEDs on and off that lie on a horizontal row in LED array 1130, the azimuth angle of the direction of propagation is changed.

Figure 12:
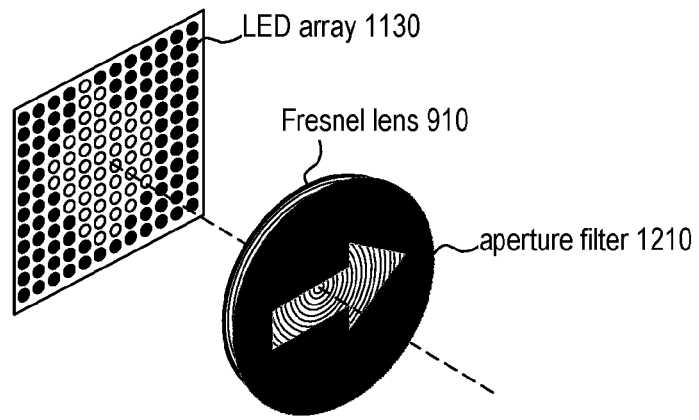
FIG. 12 depicts a technique for generating visible shapes.

FIG. 12 depicts a technique for generating visible shapes that are different from the shape of the aperture. The technique might be used, for example, in a situation where it's necessary for the traffic signal to display an arrow instead of a disk. In the figure, the light source is the same as in FIG. 11, and, therefore, the aperture is the visible surface of the Fresnel lens, whose shape is a disc. With traffic signals, arrows are a common desirable shape, and FIG. 12 depicts how the light source of FIG. 11 can be modified to be visible as a bright arrow instead of a bright disc.

To achieve the desired modification, a filter is mounted to the aperture. The filter is depicted in the figure as aperture filter 1210. The aperture filter is mostly opaque to the passage of light, except for an area in the shape of an arrow where the aperture filter is transparent. In the depiction of FIG. 12, the aperture filter is mounted in front of the Fresnel lens, as viewed from viewers on the road. The surface of the Fresnel lens is visible through the transparent area of the aperture filter. When the surface of the Fresnel lens becomes bright, viewers will see the shape of an arrow pointing to the right, as depicted in the figure.

The light source of FIG. 12, equipped with aperture filter 1210, can only display either the arrow or nothing. When some of the LEDs of LED array 1130 are turned on, some viewers will see a bright arrow pointing to the right, if they are in a portion of the viewing space that is illuminated by those LEDs. Other viewers will see a dark disc. It would be advantageous to have, instead, a traffic signal that can simultaneously display different arrows for different viewers. Such a traffic signal can be regarded as a type of multi-view display and is provided by some embodiments of the present invention.

Figure 13:
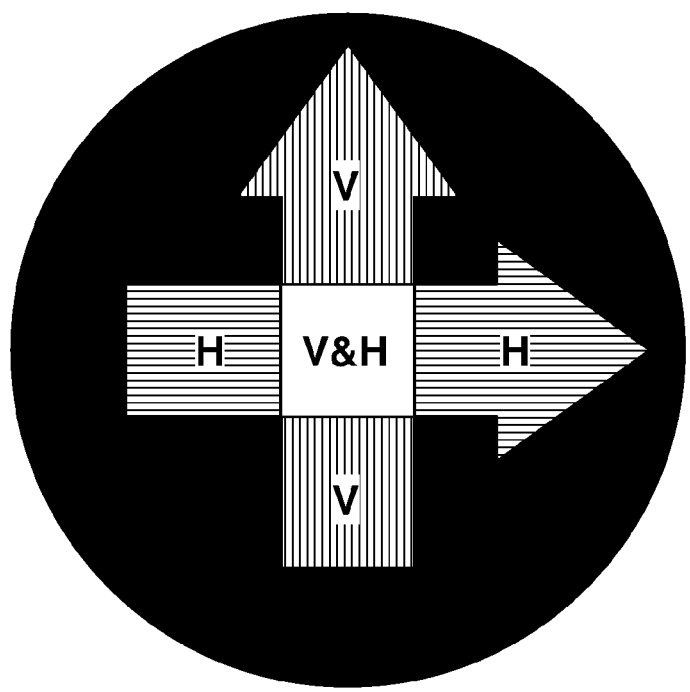
FIG. 13 depicts an aperture filter in accordance with some illustrative embodiments of the present invention.

FIG. 13 depicts an aperture filter in accordance with some illustrative embodiments of the present invention that can provide the type of multi-view display mentioned in the previous paragraph. Such an aperture filter is suitable for mounting to the light source of FIG. 12 in place of aperture filter 1210. The aperture filter 1300 is effective when the LEDs of LED array 1130 are able to emit polarized light. For example, some LEDs might be able to emit vertically polarized light, while other LEDs might be able to emit horizontally polarized light. This might be accomplished, for example, and without limitation, by placing polarizers on top of some LEDs. Such polarizers might be fixed polarizers or controllable polarizers such as LCD polarizers. It will be clear to those skilled in the art how to adapt LED array 1130 so that some or all LEDs can generate polarized light.

The aperture filter 1300 is mostly opaque to the passage of light except for an area in the shape of two intersecting arrows. In that area, some portions of the area allow the passage of only vertically polarized light, other portions allow the passage of only horizontally polarized light, and a square portion in the center allows the passage of both vertically and horizontally polarized light.

In FIG. 13, the letters "H" and "V" are used to identify the portions of the area that allow the passage of only horizontally polarized light or only vertically polarized light, respectively. The shading also indicates the polarization that is allowed through. The figure shows that vertically polarized light will pass through the aperture filter in the shape of an arrow pointing up, while horizontally polarized light will pass through the aperture filter in the shape of an arrow pointing to the right.

Illustrative embodiments of the present invention that comprise the aperture filter of FIG. 13 can implement a multi-view display that displays an arrow pointing up for some viewers, while simultaneously displaying an arrow pointing to the right for other viewers. This can be accomplished by using a light source similar to the light source of FIG. 12; however, the light source should comprise LEDs able to emit polarized light. The desired result is obtained by turning on LEDs that emit vertically polarized light for those portions of the viewing space where an arrow pointing up should be visible, while simultaneously turning on LEDs that emit horizontally polarized light for those portions of the viewing space where an arrow pointing to the right should be visible.

Figure 14:
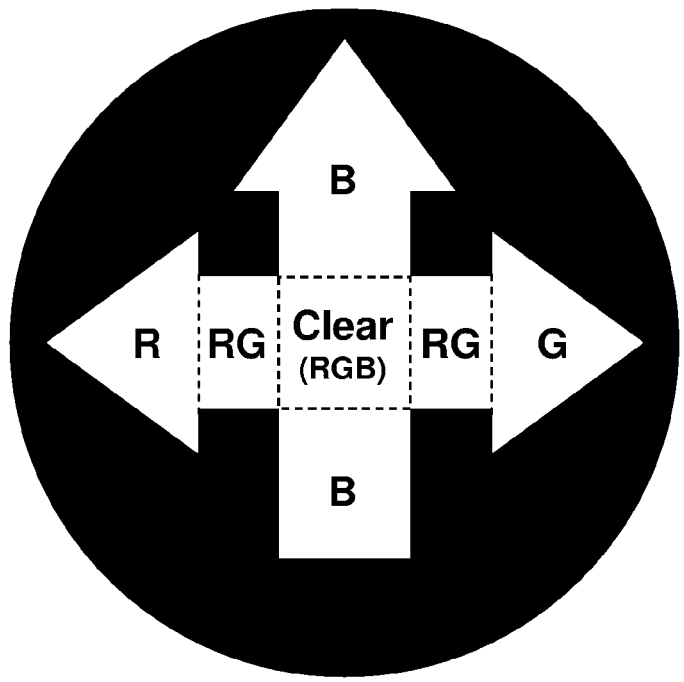
FIG. 14 depicts an aperture filter in accordance with some alternative illustrative embodiments of the present invention.

FIG. 14 depicts an aperture filter 1400 in accordance with some alternative illustrative embodiments of the present invention. This aperture filter makes it possible to display three different arrows simultaneously. The term "color-selective" is used herein to refer to filters that allow the passage of light of some colors but not others. Accordingly, the aperture filter 1400 is effective when the LEDs of LED array 1130 are able to emit light of different colors. For example, some LEDs might be able to emit red light, while other LEDs might be able to emit green light or blue light.

The area of aperture filter 1400 that allows the passage of light is comprised of several portions. Each portion allows the passage of light of some colors but not others. In FIG. 14, the letters "R", "G", and "B" are used to identify the portions of the area that allow the passage of red light, green light, and blue light, respectively. Some portions only allow the passage of light of one color, other portions allow the passage of light of two of the three colors, and the square portion in the center is labeled "clear" to indicate that it allows the passage of light of any color.

FIG. 14 shows that blue light will pass through the aperture filter in the shape of an arrow pointing up, while red light will pass through the aperture filter in the shape of an arrow pointing to the left, and green light will pass through the aperture filter in the shape of an arrow pointing to the right. Thus, Illustrative embodiments of the present invention that comprise the aperture filter of FIG. 14 can display a blue arrow pointing up for some viewers, while simultaneously displaying a green arrow pointing to the right for some other viewers, and a red arrow pointing to the left for yet other viewers.

Figure 15:
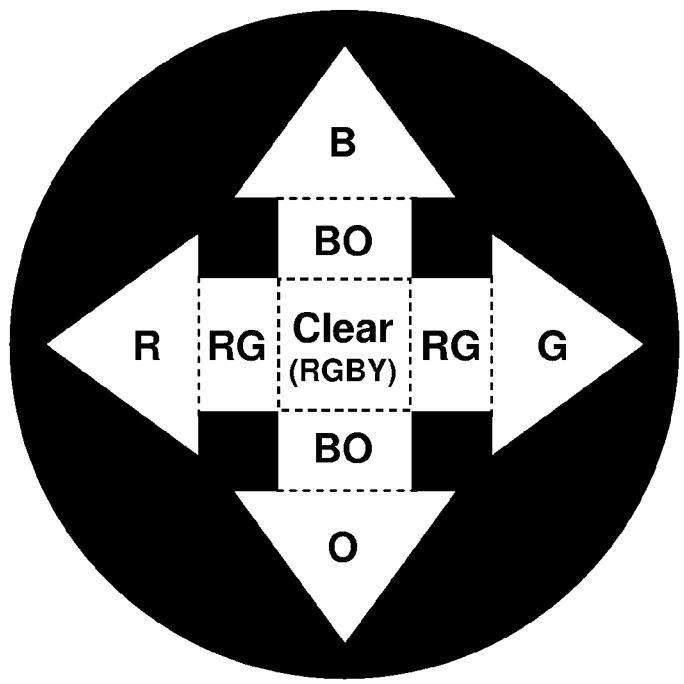
FIG. 15 depicts an aperture filter that makes it possible to display four arrows simultaneously using four different colors.

FIG. 15 depicts an aperture filter 1500 that makes it possible to display four different arrows simultaneously using four different colors. In this case, the various portions of the aperture filter are identified with the letters "R", "G", "B", and "O", for the colors red, green, blue, and orange.

The color of a particular light reflects the combination and relative strengths of wavelengths present in that light. There is an unlimited possible range of such combinations. Only some of them correspond to well-defined colors and such correspondence is not unique. The term "chromatic content" is commonly used to refer to the particular wavelength combination of a specific light. The examples of FIGS. 14 and 15 illustrate how it is possible to take advantage of color-selective aperture filters to achieve a multi-view display using a light source similar to the light source of FIG. 11, as long as the source can generate light with different chromatic content.

Because different chromatic content does not necessarily imply different color perception by humans, it will be clear to those skilled in the art, after reading this disclosure, how to make and use embodiments of the present invention wherein color-selective aperture filters similar to those of FIGS. 14 and 15 can be made that display different images based on light of different chromatic content which, nonetheless, is perceived as having the same color by human eyes. In colorimetry, metamerism is the matching of the color of objects as humans perceive them without matching their chromatic content. Colors that match this way are called metamers.

Figure 16:
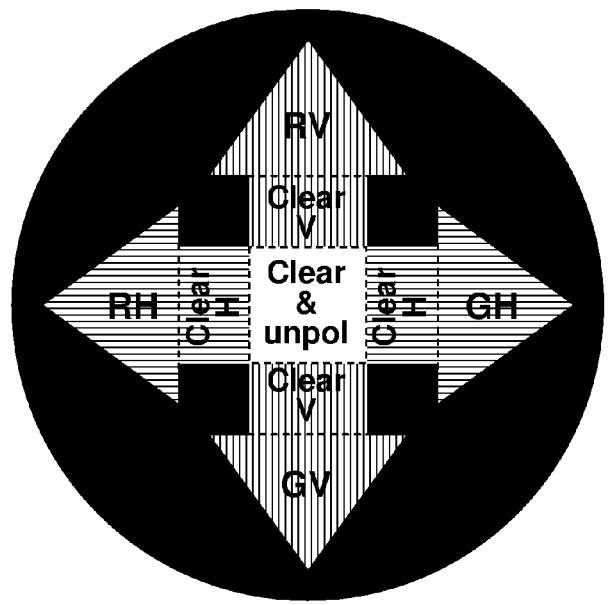
FIG. 16 depicts an aperture filter which makes it possible to display four arrows simultaneously using two different colors and two polarizations.

FIG. 16 depicts an aperture filter 1600 which makes it possible to display four arrows simultaneously using two different colors and two polarizations. In this case, the various portions of the aperture filter are identified with the letters "R" and "G" for the colors red and green, respectively, and the letters "H" and "V" for horizontal and vertical polarization, respectively. The shading also indicates the polarization that is allowed through.

It will be clear to those skilled in the art, after reading this disclosure, how to make and use embodiments of the present invention that exploit combinations of color and polarization for simultaneously displaying images of different colors, as desired, for viewing by different viewers at different locations.

To make color-selective filters, it may be advantageous to use readily available colored sheets and stack them together in layers. Such colored sheets are usually available in a limited choice of colors. It is, therefore, advantageous to have a method for combining sheets of different colors to achieve a desired result.

Figure 17:
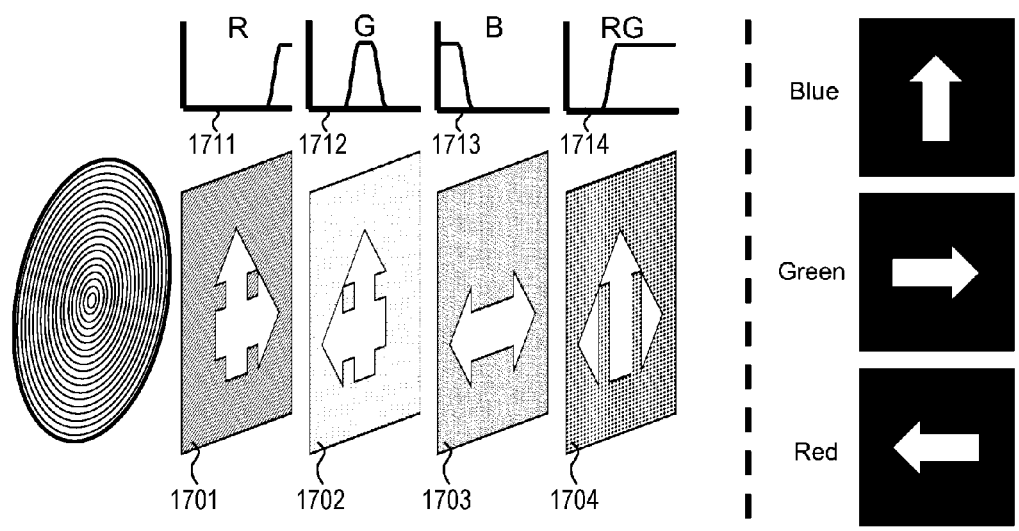
FIG. 17 shows an example of how an aperture filter might be realized using four colored sheets.

FIG. 17 shows an example of how the aperture filter 1400 of FIG. 14 might be realized using four colored sheets. In particular, in FIG. 17, colored sheet 1701 is red; i.e, it only allows the passage of light of long wavelengths, which is perceived as red by the human eye. The graph 1711 depicts the transmittance function of colored sheet 1701. Colored sheet 1702 is green; i.e., it only allows the passage of light of mid wavelengths, which is perceived as green by the human eye. The graph 1712 depicts the transmittance function of colored sheet 1702. Colored sheet 1703 is blue; i.e., it only allows the passage of light of short wavelengths, which is perceived as blue by the human eye. The graph 1713 depicts the transmittance function of colored sheet 1703. And, finally, colored sheet 1704 is yellow; i.e., it allows the passage of light of both mid and long wavelengths, which can be regarded as a mixture of blue and green, and is perceived as yellow by the human eye. The graph 1714 depicts the transmittance function of colored sheet 1704.

FIG. 17 depicts how, in each sheet, a portion of the sheet can be removed in accordance with the shapes depicted in the figure. When the four sheets are stacked together, each sheet will block light in accordance with its transmittance function, except that the areas that have been removed (cut out) do not, of course, block any light. It will be easy for those skilled in the art to verify that a stack of the four sheets 1701, 1702, 1703, and 1704, with the cut-outs depicted in FIG. 17 achieves the functionality of aperture filter 1400 of FIG. 14. Those skilled in the art will also note that this combination is not unique and will be able to formulate other combinations of colored sheets that achieve the desired result.

Figure 1:
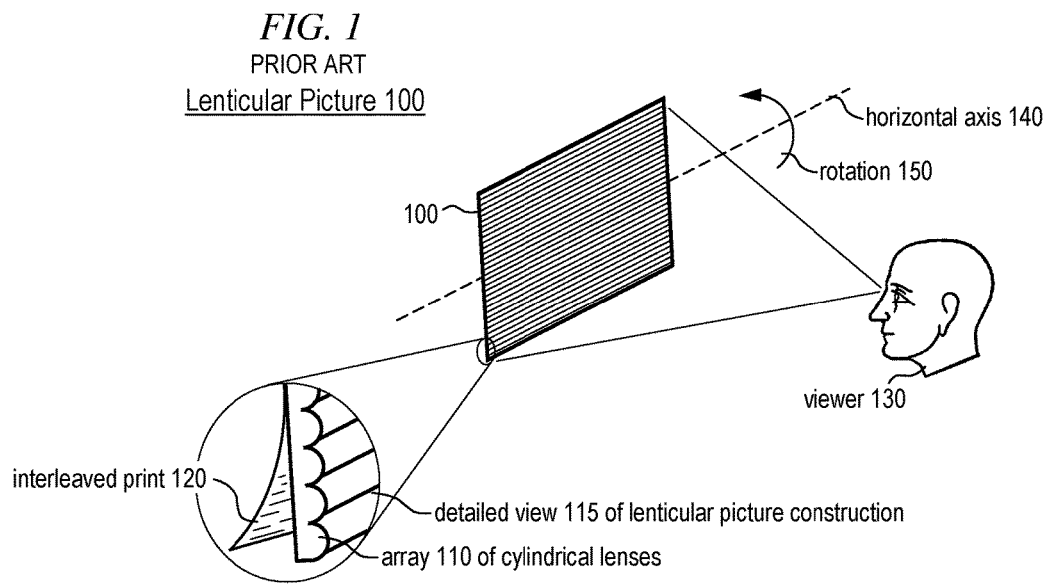
FIG. 1 depicts the structure and usage of a multi-view lenticular picture.
Figure 2:
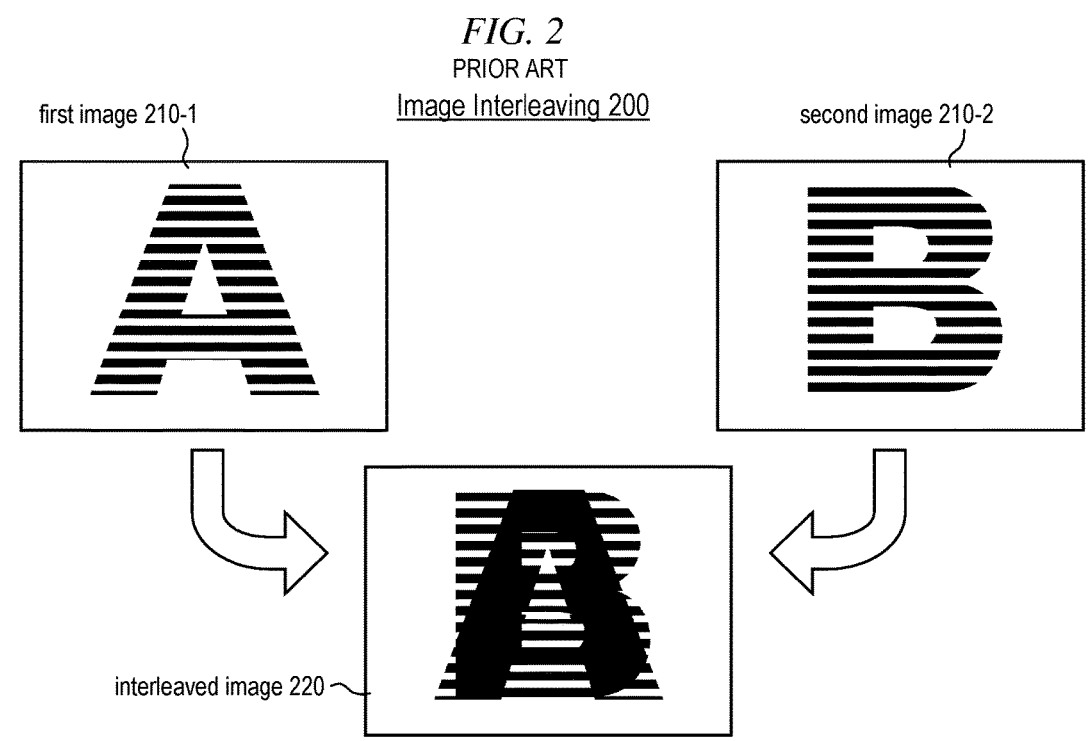
FIG. 2 illustrates the process of creating an interleaved print from two distinct images.
Figure 3:
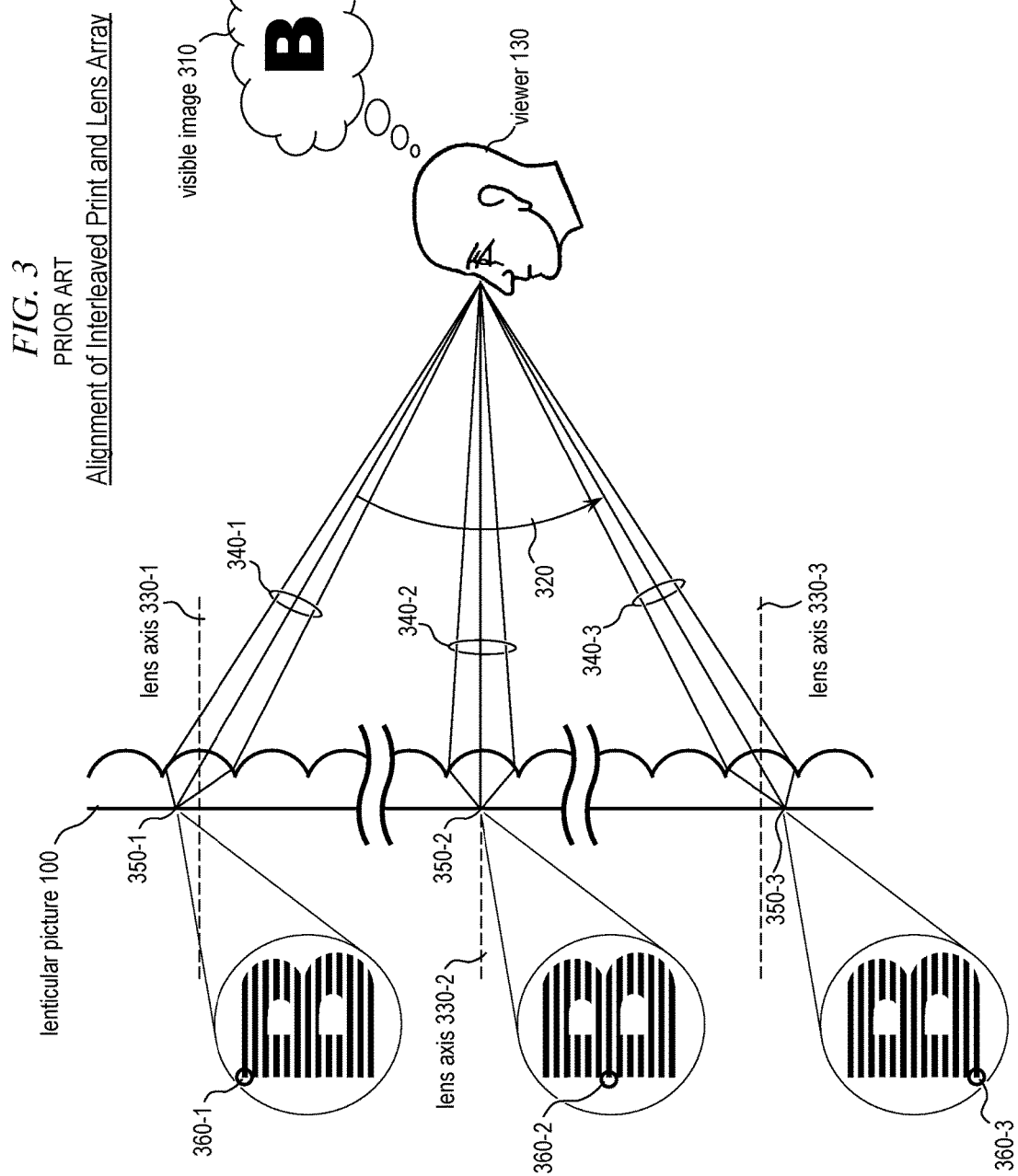
FIG. 3 illustrates the functionality of a lenticular picture.

The next few figures illustrate a method for generating a three-color aperture filter for displaying three arbitrary images using three colored sheets such as colored sheets 1701, 1702, and 1703. The method is based on interleaving the desired images via an interleaving technique somewhat similar to the interleaving technique illustrated in FIG. 2 for making the interleaved print.

Figure 18:
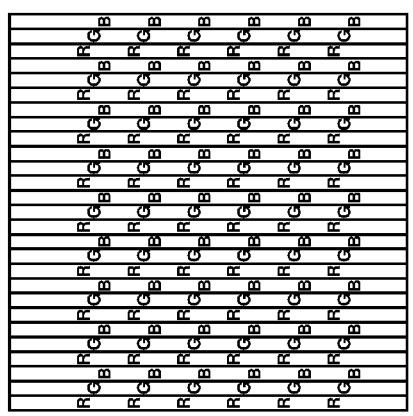
FIG. 18 shows a color interleaving pattern for realizing an aperture filter.

FIG. 18 shows a color interleaving pattern for defining the areas to be cut out in the three colored sheets. The pattern consists of narrow rectangular strips. Each strip is labeled with one of the three letters "R", "G", or "B" for the corresponding color: red, green or blue. The strips indicate the areas that should be retained in each colored sheet.

Figure 19C:
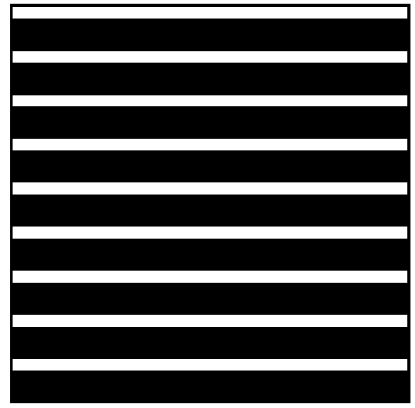
FIGS. 19*a* through 19*c* show individual cut-out patterns for three colored sheets.
Figure 19B:
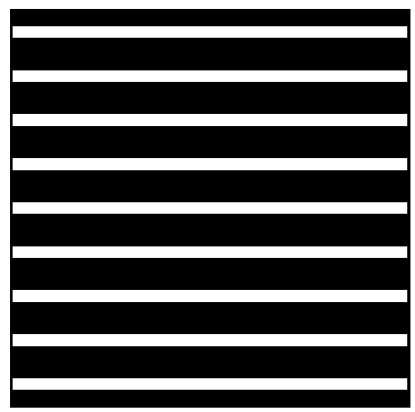
Figure 19A:
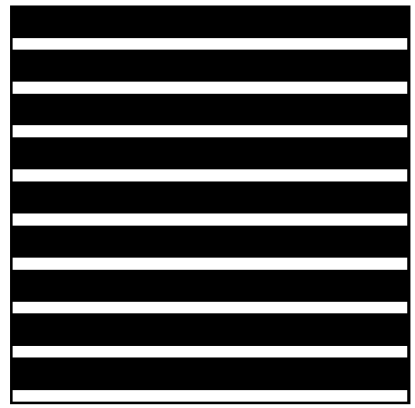

FIGS. 19a through 19c show the individual cut-out patterns for each of the three colored sheets. The white areas are to be retained. The black areas can be cut out if needed.

Figure 20C:
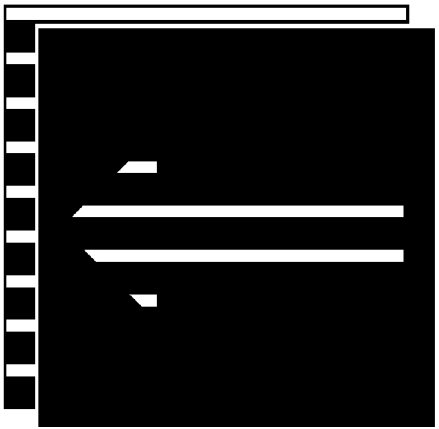
FIGS. 20*a* through 20*c* show three desired images that an aperture filter should display.
Figure 20B:
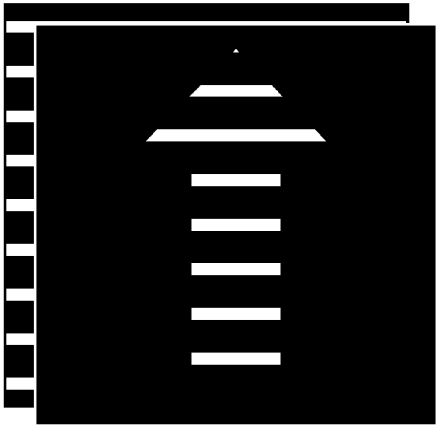
Figure 20A:
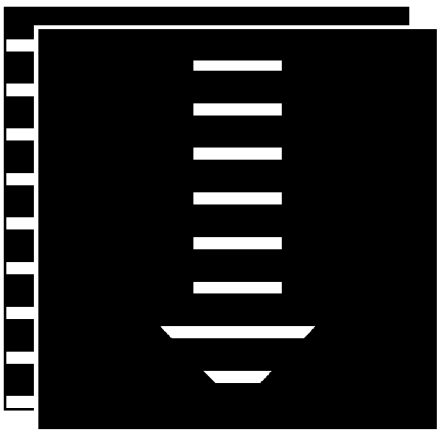

FIGS. 20a through 20c show the three desired images that the aperture filter should display with each of the three colors. In this example, the images are the three arrows that aperture filter 1400 displays with each of the three colors.

Figure 21C:
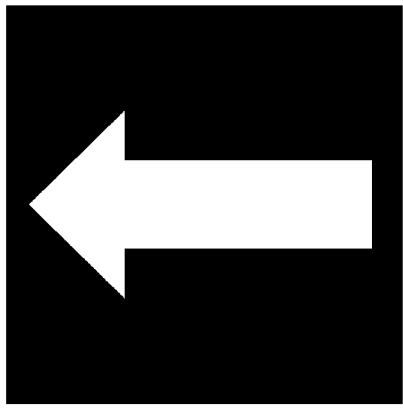
FIGS. 21*a* through 21*c* illustrate a step in the creation of an aperture filter.
Figure 21B:
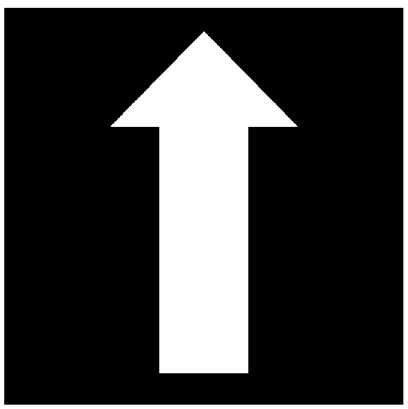
Figure 21A:
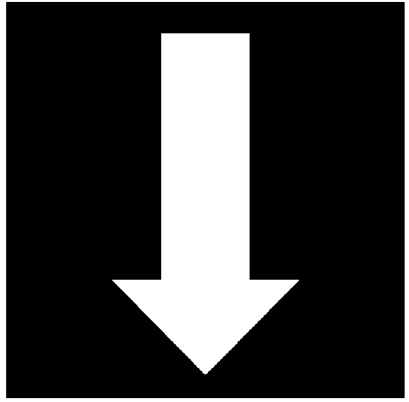

FIGS. 21a through 21c illustrate the next step, in which the images of FIGS. 20a through 20c are overlapped with the cut-out patterns of FIGS. 19a through 19c. The white areas now show where the other sheets should let light through.

Figure 22:
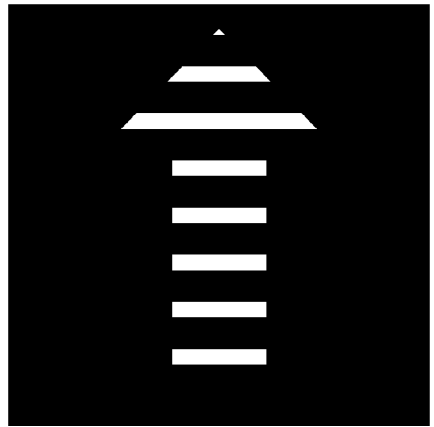
FIG. 22 shows another step in the creation of an aperture filter.
Figure 22:
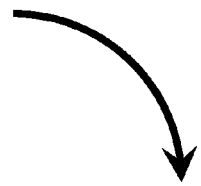
Figure 22:
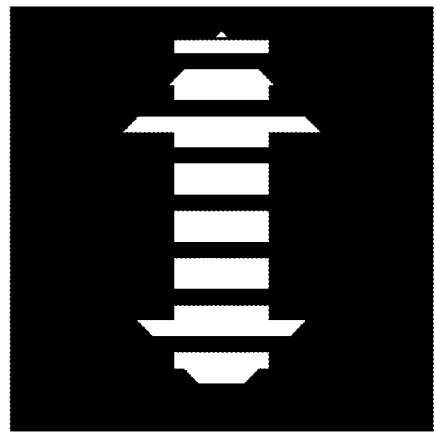
Figure 22:
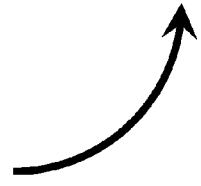
Figure 22:
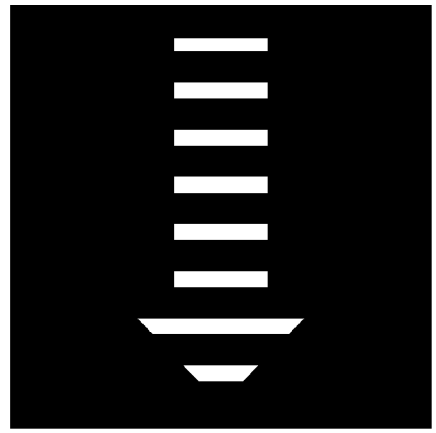

FIG. 22 shows, for just one color, the final step for obtaining the pattern to be removed from (cut out of) the corresponding sheet. For the blue sheet, the cut-outs generated in FIGS. 21a and 21b for the other two colors (red and green) are combined to yield the pattern of material that should be removed from the blue sheet. Patterns of material to be removed for the other two colored sheets are obtained in a similar fashion.

It will be clear to those skilled in the art, after reading this disclosure, how to define and use equivalent methods for generating multiple-color aperture filters using multiple colored sheets with different parameters. For example, and without limitation, the method can be easily adapted or extended to any number of colors and colored sheets. Also, a color interleaving pattern different from the color interleaving pattern of FIG. 18 can be used. In particular such a pattern can comprise, for example and without limitation, horizontal rectangles, hexagons in a periodic two-dimensional pattern, dot patterns similar to the pixel patterns of color displays, etc., to name just a few.

The aperture filters presented so far can be referred to as "passive" aperture filters because they filter light solely by virtue of their physical properties without the option of electronic control of their filtering parameters. In contrast, modern technology provides active light filters of various types such as so-called liquid-crystal displays (LCD). An active light filter such as an LCD filters can display one of a plurality of different images under electronic control.

Figure 23B:
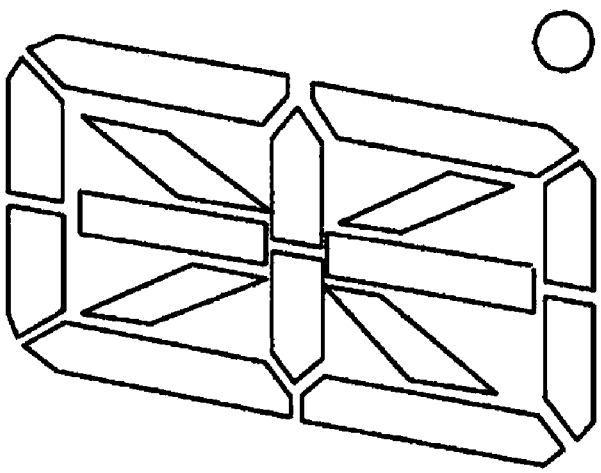
FIGS. 23*a* and 23*b* show two segment patterns commonly used in segment displays.
Figure 23A:
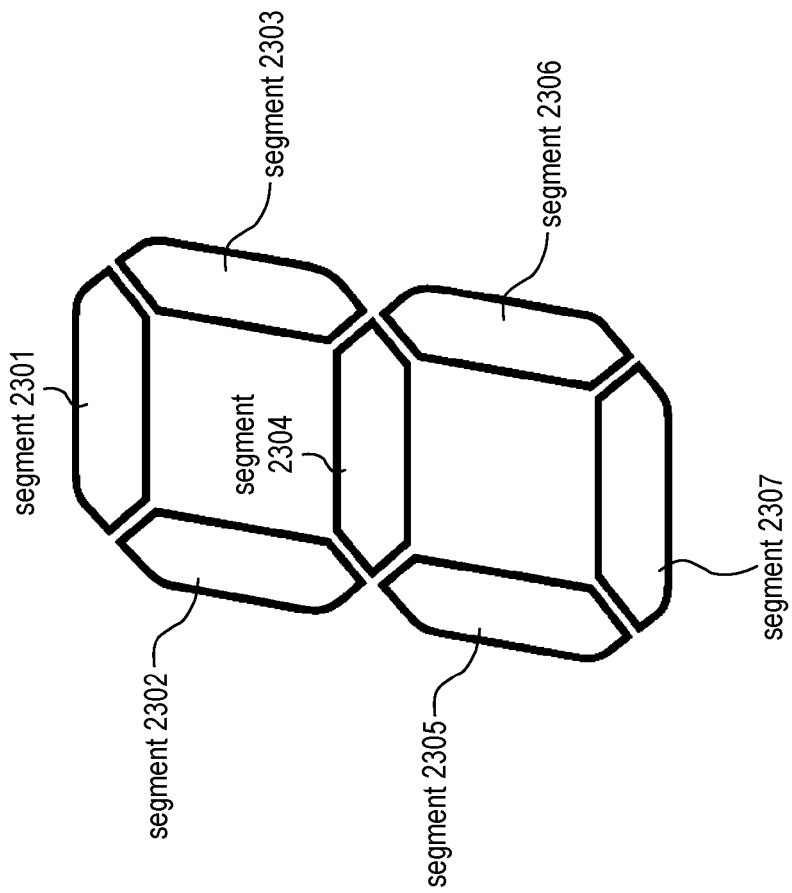

FIGS. 23a and 23b show two patterns commonly used by active filters for displaying information. These patterns are known as segment patterns because the images that they can display are generated as combinations of elongated areas referred to as "segments".

The pattern of FIG. 23a is the so-called seven-segment pattern for displaying numerical information. It can display any one of the ten digits 0-9 by turning on or off different segments in accordance with the shape of the desired digit. The name derives from the fact that it comprises seven segments, depicted as elongated areas 2301 through 2307 in FIG. 23a.

The segment pattern of FIG. 23b comprises sixteen segments for displaying alphabetic characters in addition to digits. It also comprises a seventeenth segment in the shape of a circular dot for displaying a decimal point or a period. Other types of segment patterns are also known in the art for displaying a variety of shapes and information. In some patterns, the decimal point is accompanied by an additional segment for displaying a comma.

The term "segment" originated with patterns such as the patterns of FIGS. 23a and 23b wherein most of the "segments" do, indeed, resemble elongated segments. However, even display patterns that comprise images and silhouettes that do not resemble geometrical segments are often referred to as segment patterns and the displays are often referred to as segment displays. In general, such patterns comprise a plurality of shapes (the segments) that can be independently turned on or off to generate images either individually or as composite images of multiple segments.

Displays with segment patterns are often realized as LCD displays, wherein the individual segments can be individually caused to be transparent or opaque in response to an electrical signal.

Figure 24:
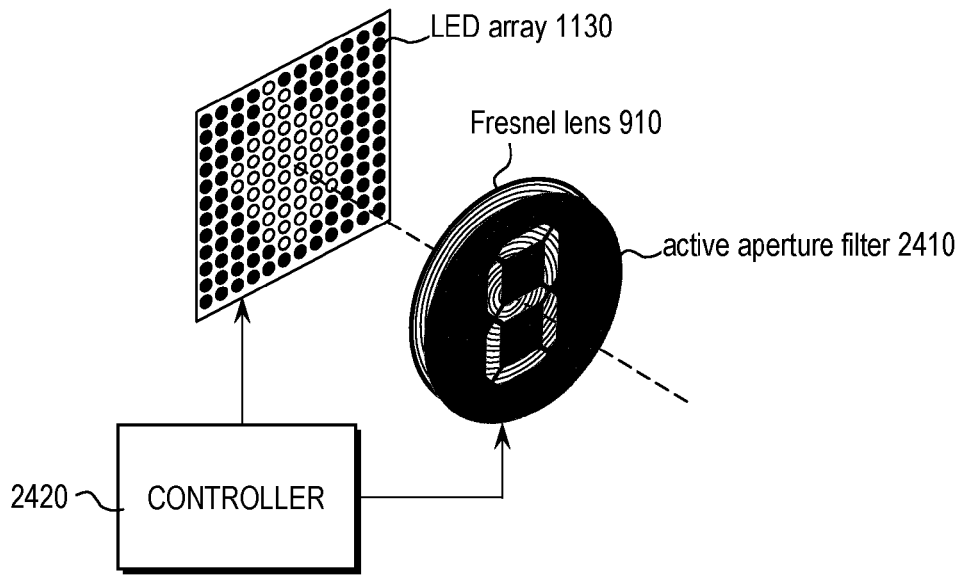
FIG. 24 depicts the structure of a multi-view display that utilizes an active aperture filter.

FIG. 24 depicts the structure of a multi-view display in accordance with an illustrative embodiment of the present invention that utilizes an active aperture filter. In the figure, aperture filter 2410 is an active aperture filter that implements the seven-segment pattern of FIG. 23a via an LCD display. Controller 2420 controls both the LCD display and the LED array 1130. The controller can cause the LCD display to display a particular segment pattern while, at the same time, turning on a group of one or more selected LEDs in the LED array.

The particular group of LEDs that is turned on will cause the segment pattern to be visible in those portions of the viewing space that receive light from those LEDs. At a later time, the controller can cause the LCD display to display a second segment pattern, while turning on a second group of LEDs. The second segment pattern will then be visible in those portions of the viewing space that receive light from the second group of LEDs.

The controller can alternate between the first combination of LEDs and segment pattern and the second combination of LEDs and segment pattern for the purpose of simultaneously displaying the two segment patterns to two different portions of the viewing space. While viewers in one portion of the viewing space see one pattern, viewers in the other portion of the viewing space will see no pattern, and vice versa. As the controller alternates between patterns, viewers will perceive patterns that flash on and off.

In some application, the on-off flashing of the patterns might be acceptable, or even desirable. If not, the controller can make the rate of alternation between the two patterns faster to the point where the on-off flashing is perceived as just a flicker.

Figure 4:
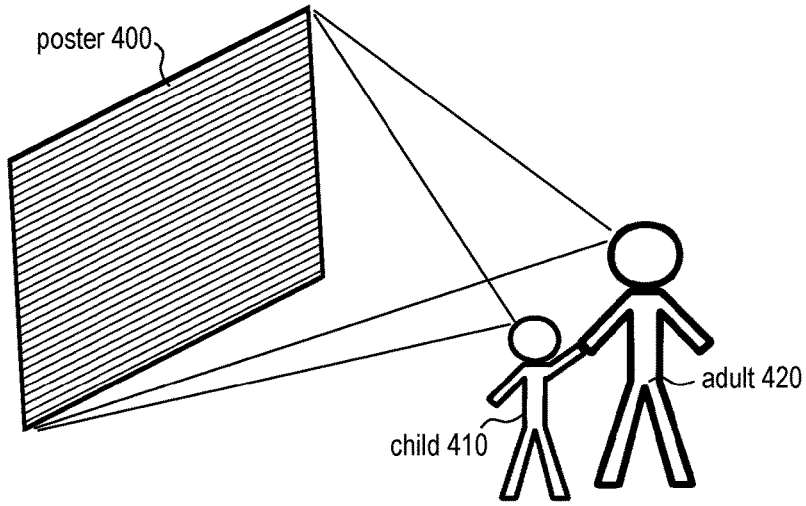
FIG. 4 depicts a prior-art application for a dual-view lenticular picture. The child and the adult see different images while looking at the poster.
Figure 5:
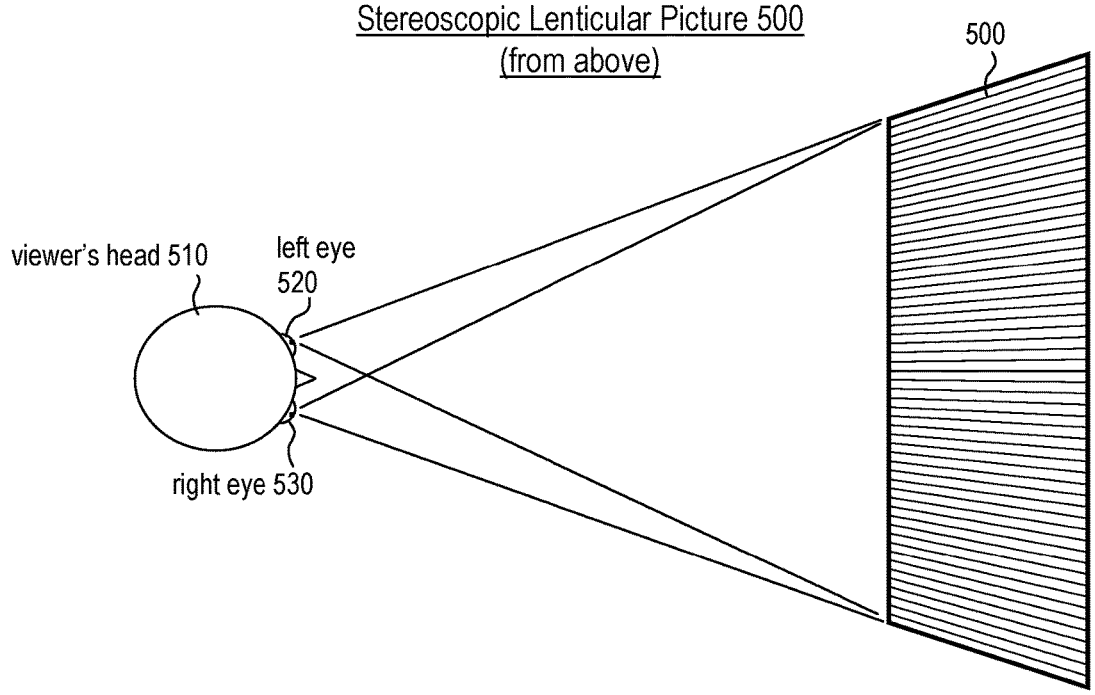
FIG. 5 depicts a stereoscopic lenticular picture.
Figure 6:
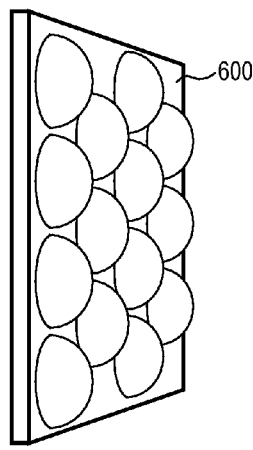
FIG. 6 shows a lens array of spherical lenses in the prior art.
Figure 7:
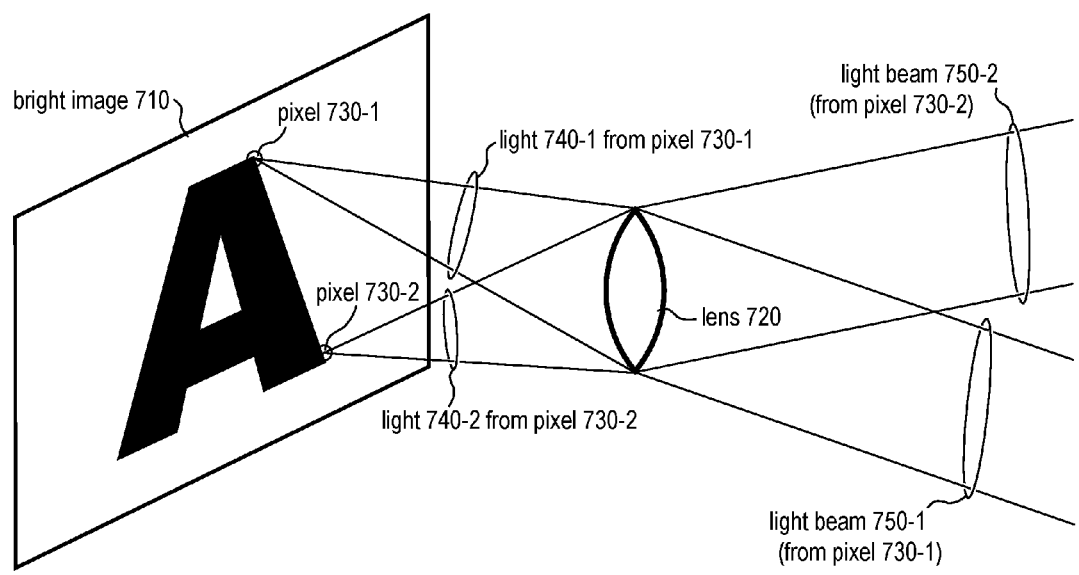
FIG. 7 illustrates the principle of operation of a typical image projector.

If the rate of alternation is faster than the flicker fusion threshold of human vision, viewers will not notice flickering. The viewers associated with the first group of LEDs will see only the first segment pattern, while the viewers associated with the second group of LEDs will see only the second segment pattern. In this manner, the multi-view display of FIG. 4 can seemingly simultaneously display different images to different viewers. If there are more than two different images to be displayed to more than two different groups of viewers, the controller can display a sequence of more than just two combinations, as needed.

In the illustrative embodiment of FIG. 24, the aperture filter 2410 comprises a full seven-segment pattern capable of displaying, for example, a numerical digit under the control of controller 2420. Multi-digit numbers can be displayed by using multiple instances of the multi-view display of FIG. 24. However, in some applications, it might be desirable to display more than one digit with aperture filter 2410. This can be accomplished by using an LCD display that implements, for example, two seven-segment patterns on aperture filter 2410.

In other applications it might be desirable to display fewer than the full seven segments on aperture filter 2410. For example, it might be desirable to display only one of the seven segments on aperture filter 2410.

Figure 25:
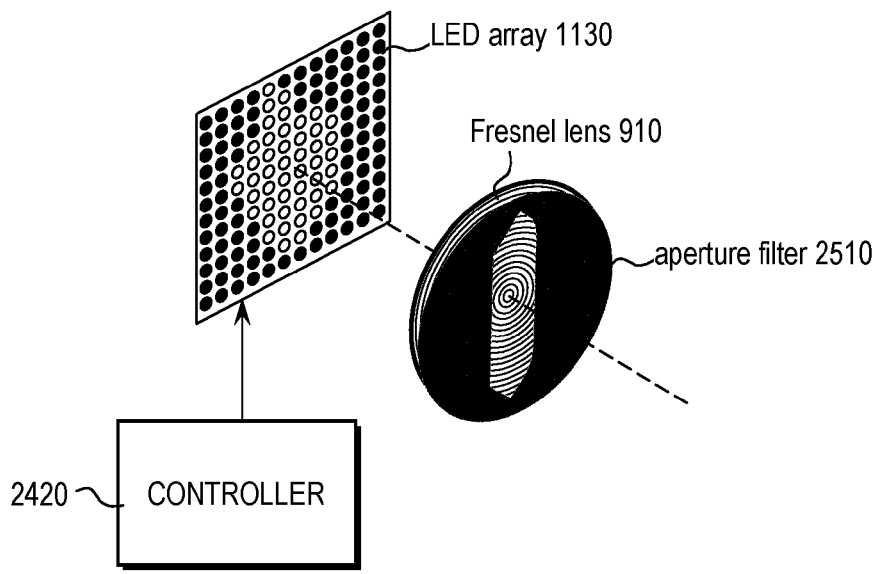
FIG. 25 depicts a multi-view display that displays one segment.

FIG. 25 depicts a multi-view display similar to the multi-view display of FIG. 24, except that, in this case, the aperture filter 2510 only displays one of the seven segments. The remaining six segments might be displayed on six other multi-view displays similar to this one.

An advantage of the multi-view display of FIG. 25 is that there are only two possible states for the displayed image: on or off. Therefore, the controller will not need to sequence among combinations of LEDs and segments. The aperture filter does not need to be an active filter. The controller can simply turn on the LEDs that generate light for those locations where the segment is supposed to be on, and leave the other LEDs turned off. That's why FIG. 25 does not show an arrow connecting controller 2420 to aperture filter 2510.

In FIG. 25, the aperture filter is circular in shape, with the segment shape lying inside the circle. However, FIG. 23a shows that segments in the seven-segment pattern must be rather close to one another in order to provide the desired visual experience. This might be difficult to achieve when juxtaposing multiple instances of the multi-view display of FIG. 25

Figure 26:
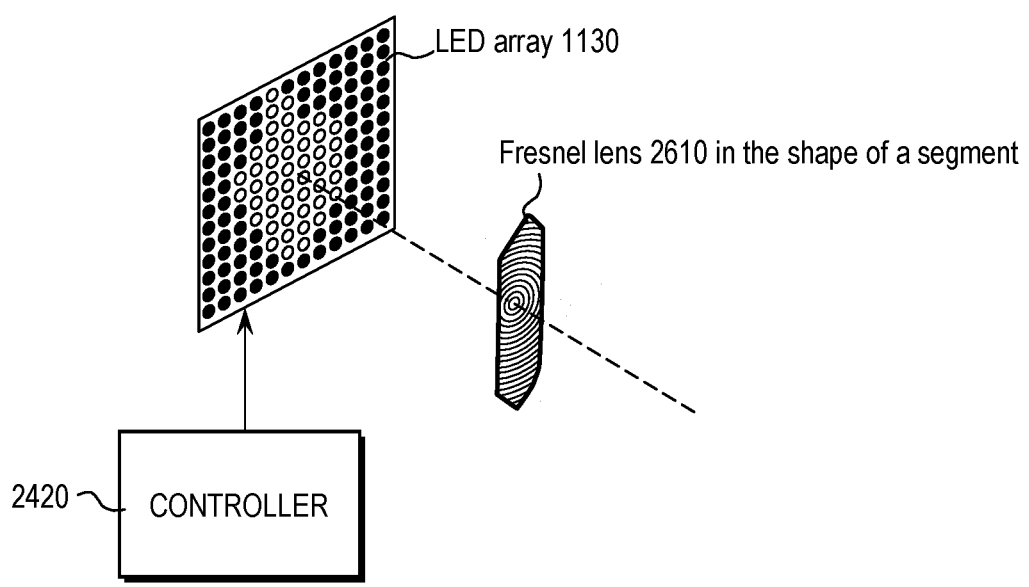
FIG. 26 depicts a multi-view display with an aperture in the shape of a segment.

FIG. 26 shows a possible solution to the problem mentioned in the previous paragraph. Fresnel lenses, and also other types of lenses, are not limited to a circular shape. They can be made in a wide variety of shapes, including, for example, and without limitation, the shape of a segment in a seven-segment pattern. The Fresnel lens of FIG. 26 has been made in the shape of the segment to be displayed. This shape will make it easier to juxtapose multiple multi-view displays wherein each one of them displays a single segment to form a seven-segment pattern or other segment patterns.

Although embodiments of the present invention are presented in this disclosure based on the light-source structure of FIG. 11, it will be clear to those skilled in the art, after reading this disclosure, how to make and use embodiments of the present invention wherein other equivalent light sources are used. For example, and without limitation, any light source can be used that has a light-emitting aperture that can uniformly emit light whose direction of propagation is controllable.

Although in this disclosure the light source of FIG. 11 is depicted as using an LED array in the focal plane of the Fresnel lens, it will be clear to those skilled in the art, after reading this disclosure, how to make and use embodiments of the present invention wherein a different focal-plane device is used. For example, and without limitation, the focal-plane device might be a pixel-based conventional display device such as, for example, and without limitation, an LCD-based display device. Also, although the device is identified as being positioned in the focal plane of the lens, it will be clear to those skilled in the art, after reading this disclosure, that other positions for the device might also be effective in some embodiments of the present invention.

Although in this disclosure the aperture of the light source is shown as being a Fresnel lens, it will be clear to those skilled in the art, after reading this disclosure, how to make and use embodiments of the present invention wherein the aperture is something else. For example, and without limitation, the aperture might be a lens other than a Fresnel lens, or a prism, or a diffraction grating, or a zone plate, or something else.

Although aperture filters in this disclosure are depicted as mounted in front of the aperture, when viewed from the viewing space, it will be clear to those skilled in the art, after reading this disclosure, how to make and use embodiments of the present invention wherein an aperture filter is mounted differently. For example, and without limitation, an aperture filter might be mounted behind the Fresnel lens or other aperture device. this is possible because Fresnel lenses can be made very thin, and other possible aperture devices, such as, for example, diffraction gratings or zone plates, can also be made very thin. With such thin devices, an aperture filter might be just as effective if placed behind the device, instead of in front, as seen from the viewing space.

For proper operation of multi-view displays in accordance with embodiments of the present invention, the display controller, such as, for example, controller 2420, must know which LEDs to turn on when an image is to be made visible for a desired group of viewers. Such information can be obtained via a calibration of the multi-view display.

Such calibration can be accomplished via a system that comprises:
  (i) the multi-view display itself;
  (ii) a light source that is part of the multi-view display, wherein the light source comprises a light-emitting aperture that emits light whose direction of propagation is controllable;
  (iii) a controller that controls the direction of propagation of the light, such as, for example and without limitation, controller 2420;
  (iv) a light detector that detects the light emitted by the light-emitting aperture and generates a detection outcome based thereon;
  (v) a localization system that generates an identification of a viewing location, the location being where the light detector is positioned;
  (vi) a processor that receives the detection outcome, the identification of the viewing location, the direction of propagation of the light, and generates a relationship between the viewing location and the direction of propagation of the light;
  (vii) a storage medium into which the processor records the relationship between the viewing location and the direction of propagation of the light.

The light source might be, for example, and without limitation, the light source of FIG. 11, wherein the Fresnel lens is the light-emitting aperture.

The calibration system can further comprise
  (viii) an active aperture filter mounted to the aperture, such as, for example, and without limitation, active aperture filter 2410, which is controllable by the controller in (iii) and can display two or more different images.

The light detector in (iv) might be, for example and without limitation, a camera that is deployed in the viewing space of the multi-view display. The camera can be used to detect light at multiple locations in the viewing space; wherein the light is emitted by the multi-view display.

The localization system might be, for example, and without limitation, based on one or more cameras that capture images of at least part of the viewing space of the multi-view display. Such one or more cameras might be, for example, and without limitation, affixed to the multi-view display itself. The images from such one or more cameras can be used, for example, and without limitation, to detect the presence and position of the light detector in the viewing space.

The processor and storage medium of (vi) and (vii) might be, for example and without limitation, part of controller 2420.

It is to be understood that this disclosure teaches just one or more examples of one or more illustrative embodiments, and that many variations of the invention can easily be devised by those skilled in the art after reading this disclosure, and that the scope of the present invention is defined by the claims accompanying this disclosure.

What is claimed:
1. A multi-view signal device comprising:
  (i) a light source that comprises a light-emitting aperture that emits light, the light comprising first light having a first direction of propagation and a first characteristic and second light having a second direction of propagation and a second characteristic, wherein, collectively, the light source and light-emitting aperture, are selectively electronically controllable to emit:
    (a) only the first light;
    (b) only the second light;
    (c) both the first light and the second light;
  (ii) a passive aperture filter mounted to the aperture, the passive aperture filter defining a mask including an opaque region and an optically transmissive region, wherein the optically transmissive region defines a shape of a first image and a second image, and further wherein:
    when the first light is emitted, the passive aperture filter interacts with the first characteristic to form the first image, viewable from a first viewing location based on the first direction of propagation;
    when the second light is emitted, the passive aperture filter interacts with the second characteristic to form the second image, viewable from a second viewing location based on the second direction of propagation;

when both the first light and the second light are simultaneously emitted, the passive aperture filter interacts with the respective first characteristic and second characteristic to form, when viewed from the first location, the first image but not the second image, and when viewed from the second location, the second image but not the first image; and the first image and the second image are different from one another.

2. The multi-view signal device of claim 1 wherein the direction of propagation of the light is controllable in two dimensions.

3. The multi-view signal device of claim 1 wherein the first characteristic is a first chromatic content and the second characteristic is a second chromatic content.

4. The multi-view signal device of claim 1 wherein the first characteristic is a first polarization state and the second characteristic is a second polarization state.

5. A multi-view signal device comprising:
   (i) a light source that comprises a light-emitting aperture that emits light, wherein the light-emitting aperture is a convergent lens;
   (ii) an active aperture filter mounted to the aperture, the active aperture filter defining a mask including an opaque region and an optically transmissive region, wherein the optically transmissive region defines a shape of a first image and a second image, and;
   (iii) a controller that controls the direction of propagation of the light from the aperture in multiple angular dimensions and also controls the active aperture filter, causing the active aperture filter to have a first configuration at a first time and a second configuration at a second time;
   wherein:
   (a) when the active aperture filter has the first configuration, it displays the first image, when viewed via the light emitted by the aperture;
   (b) when the active aperture filter has the second configuration, it displays the second image, when viewed via the light emitted by the aperture; and
   (c) the first image and the second image are different from one another.

6. The multi-view signal device of claim 5 wherein the controller causes the light to:
   (I) propagate in a first direction at the first time, thereby resulting in the display of the first image at the first time, when viewed a first viewing location based on the first direction; and
   (II) propagate in a second direction at the second time, thereby resulting in the display of the second image at the second time, when viewed from a second viewing location based on the second direction.

7. The multi-view signal device of claim 6 wherein the controller alternates between I and II at a rate that is faster than the flicker fusion threshold of human vision.

8. The multi-view signal device of claim 5 wherein the convergent lens is a Fresnel lens.

9. The multi-view signal device of claim 5 wherein the active aperture filter comprises a plurality of controllable elements in the shape of segments.

10. The multi-view signal device of claim 5 wherein the active aperture filter is a liquid-crystal-display (LCD) filter.

11. A multi-view signal device comprising a segment display, the multi-view signal device comprising a plurality of light sources, each comprising a light-emitting aperture that emits light, wherein:
   (a) the light emitted by each aperture is electronically controllable to have a first direction of propagation at a first time and a second direction of propagation at a second time;
   (b) each aperture being a convergent lens in the shape of a segment of the segment display; and
   (c) the segments are arranged in a pattern suitable for representing information.

12. The multi-view signal device of claim 11 wherein the pattern comprises a seven-segment pattern for representing digits.

13. The multi-view signal device of claim 11 wherein pattern comprises a multiple-segment pattern for representing a character chosen from a set of alphanumeric characters.

14. The multi-view signal device of claim 11 wherein the convergent lens is a Fresnel lens.

\* \* \* \* \*